United States Patent
Krimmel et al.

(10) Patent No.: US 7,188,013 B2
(45) Date of Patent: Mar. 6, 2007

(54) METHOD FOR CROSS-LINKING OF REGULATION-AND/OR CONTROL FUNCTIONS FOR A MOTOR VEHICLE

(75) Inventors: Horst Krimmel, Tettnang (DE);
Wolf-Dieter Gruhle, Tettnang (DE);
Martin Spiess, Uhldingen (DE); Claus Granzow, Tettnang (DE); Udo Gillich, Tettnang (DE); Roland Geiger, Wilhelmsdorf (DE); Jürgen Lucas, Immenstaad (DE); Frank König, Ravensburg (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 409 days.

(21) Appl. No.: 10/795,768

(22) Filed: Mar. 8, 2004

(65) Prior Publication Data

US 2004/0181316 A1    Sep. 16, 2004

(30) Foreign Application Priority Data

Mar. 11, 2003    (DE) ................ 103 10 422

(51) Int. Cl.
*G01F 7/00*    (2006.01)
*B60R 16/02*    (2006.01)
*G06N 5/00*    (2006.01)
*G06N 7/00*    (2006.01)

(52) U.S. Cl. .................. 701/48; 701/1; 706/59; 706/45; 370/537; 370/539

(58) Field of Classification Search .............. 701/29, 701/48, 1; 706/59, 45; 340/438; 714/736, 714/820; 370/537, 539; *G06F 17/00*
See application file for complete search history.

(56) References Cited

U.S. PATENT DOCUMENTS

| | | | | |
|---|---|---|---|---|
| 5,282,195 A | * | 1/1994 | Hood et al. | 370/378 |
| 5,351,776 A | * | 10/1994 | Keller et al. | 701/70 |
| 5,436,837 A | * | 7/1995 | Gerstung et al. | 701/29 |
| 5,696,884 A | * | 12/1997 | Heckerman et al. | 706/61 |
| 5,704,017 A | * | 12/1997 | Heckerman et al. | 706/12 |
| 5,704,018 A | * | 12/1997 | Heckerman et al. | 706/12 |
| 5,715,374 A | * | 2/1998 | Heckerman et al. | 706/46 |
| 5,802,256 A | * | 9/1998 | Heckerman et al. | 706/59 |
| 6,092,006 A | * | 7/2000 | Dominke et al. | 701/1 |

(Continued)

FOREIGN PATENT DOCUMENTS

DE    41 11 023 A1    10/1992

(Continued)

OTHER PUBLICATIONS

Zhaoyu Li et al., A framework for ordering composite beliefs in belief networks, Systems, Man and Cybernetics, IEEE Transactions on, vol. 25, Feb. 2, 1995, pp. 243-255.*

Dagum, P. et al., Approximating probabilistic inference in Bayesian belief networks, IEEE Transactions on Pattern Analysis and Machine Intelligence, vol. 15, Mar. 3, 1993, pp. 246-255.*

(Continued)

*Primary Examiner*—Cuong Nguyen
(74) *Attorney, Agent, or Firm*—Davis Bujold & Daniels, P.L.L.C.

(57) ABSTRACT

A method for interlinking regulation and/or control functions for a motor vehicle, the communication structure of the control or regulation functions is defined by way of graphs containing nodes and directed gridlines, the nodes of the graph representing control or regulation functions and its directed gridlines representing defined communication paths of the control or regulation functions.

18 Claims, 4 Drawing Sheets

U.S. PATENT DOCUMENTS

| | | | |
|---|---|---|---|
| 6,154,736 A * | 11/2000 | Chickering et al. | 706/59 |
| 6,339,739 B1 * | 1/2002 | Folke et al. | 701/70 |
| 6,360,172 B1 * | 3/2002 | Burfeind et al. | 702/2 |
| 6,373,399 B1 * | 4/2002 | Johnson et al. | 340/870.11 |
| 6,604,048 B2 * | 8/2003 | Ishida et al. | 701/213 |
| 6,728,635 B2 * | 4/2004 | Hamada et al. | 701/211 |
| 6,968,364 B1 * | 11/2005 | Wong et al. | 709/217 |
| 2002/0069020 A1 * | 6/2002 | Burfeind et al. | 702/2 |
| 2003/0103521 A1 * | 6/2003 | Raphaeli et al. | 370/445 |
| 2003/0227373 A1 * | 12/2003 | Lou et al. | 340/310.01 |
| 2004/0181316 A1 * | 9/2004 | Krimmel et al. | 701/1 |

FOREIGN PATENT DOCUMENTS

| | | |
|---|---|---|
| DE | 197 09 318 A1 | 9/1998 |
| DE | 197 42 450 A1 | 4/1999 |
| DE | 198 38 336 A1 | 3/2000 |
| DE | 41 14 999 C2 | 4/2001 |
| DE | 100 34 869 A1 | 2/2002 |
| DE | 10310422 A1 * | 9/2004 |

OTHER PUBLICATIONS

Abdelbar et al., A parallel hybrid genetic algorithm simulated annealing approach to finding most probable explanations on Bayesian belief networks, Inter. Conf. on Neural Networks, Jan. 1997, vol. 1 pp. 450-455.*

Shang-Hua Wang et al., Dynamic structuring of belief networks in a hierarchical perceptual organization, Speech, Image Processing and Neural Networks, 1994, Inter. Symposium on , pp. 519-522, vol. 2, Jan. 1997.*

J Diaz et al., A random graph model for optical networks of sensors, IEEE Transactions on Mobile Computing, Jul.-Sep. 2003, vol. 2, issue 3; pp. 186-196 (from IEEE Xplore, Sep. 23, 2003).*

T.J. Jankun-Kelly et al., Deploying Web-based visual exploration tools on the grid, IEEE Computer Graphics and Applications, Mar.-Apr. 2003, vol. 23 issue 2, pp. 40-50 (from IEEE Xplore, posted on Mar. 20, 2003).*

J. Leigh et al., TeraVision: a platform and software-independent solution for real-time distribution in advanced collaborative environments, Proc. Access Grid Retreat; http://www.fp.mcs.anl.vov/fl/accessgrid/agretreat2002/proc./leightera.pdf.*

Q. Zheng et al., An agenda based mobility model, Proceedings of the 39the Annual Simulation Symposium (ANSS'06).*

K. Jeevan Madhu et al., Parallel algorithms for vehicle routing problems, Computer Science & Engineering, Indian Institute of Technology, Kanpur, India—208 016.*

Mario. Cannataro et al.,Distributed data mining on grids: services, tools, and application, IEEE Transactions on systems, man, and cyberetics—part B: Cybernetics, vol. 34, No. 6, Dec. 2004.*

V. Saligrama et al., Distributed detection in sensor networks with packet losses and finite capacity links, IEEE Transactions on Signal Processing, Nov. 2006, vol. 54, issue 11; pp. 4118-4132, posted online: Oct. 16, 2006.*

Tsu-Tian Lee et al., The linguistic control model of vehicle driving, Proceedings of the 2$^{nd}$ International Conference on machine learning and cybernetics, Xian, Nov. 2-5, 2003; pp. 951-956.*

* cited by examiner

| Function G | | Function $R_i$ | | | | |
|---|---|---|---|---|---|---|
| | | Body-Vehicle Acceleration | Roll Angle | Pitch Angle | Vehicle-Level | Individual Wheel Slip |
| | | $R_1$ | $R_2$ | $R_3$ | $R_4$ | $R_5$ |
| Body-Vehicle Acceleration | $G_1$ | X | | | | |
| Roll Angle | $G_2$ | | X | | | |
| Pitch Angle | $G_3$ | | | X | | |
| Vehicle-Level | $G_4$ | | | | X | |
| Individual Wheel Slip | $G_5$ | | | | | X |

Fig. 3

| Function $S_i$ / Function $R_i$ | | Variable Damping $S_1$ | Active Stabilizer Torque $S_2$ | Individual Wheel Level $S_3$ | Engine Torque $S_4$ |
|---|---|---|---|---|---|
| Body-Vertical Acceleration | $R_1$ | X | | | |
| Roll Angle | $R_2$ | X | X | | |
| Pitch Angle | $R_3$ | X | | | |
| Vehicle Level | $R_4$ | | | X | |
| Individual Wheel Slip | $R_5$ | | X | | X |

Fig. 4

METHOD FOR CROSS-LINKING OF REGULATION-AND/OR CONTROL FUNCTIONS FOR A MOTOR VEHICLE

This application claims priority from German Application Serial No. 103 10 422.4 filed Mar. 11, 2003.

FIELD OF THE INVENTION

The present invention concerns a method for interlinking regulation and/or control functions in a motor vehicle.

BACKGROUND OF THE INVENTION

Nowadays numerous different systems are incorporated in motor vehicles, and their number will increase as time goes by; examples of such systems are the electronic engine controls, the electronic transmission controls, the ASR (drive slip regulation) and ABS (anti-blocking system) functions, the shift strategy controls, the level adjustment, etc.

In this, the situation can arise that the functions have a reciprocally negative influence on one another; furthermore, the allocation of control and regulation algorithms to functional modules often takes place unsystematically. This in turn means that an extension of the function structure is very time-consuming and expensive.

Owing to the multiplicity of systems used, some of which act on the same vehicle components, for example comfort and driving stability functions which both influence the shock-absorbers, a defined optimum cooperation of these systems is necessary in order to ensure safe and comfortable driving behavior.

From the prior art, methods or systems are known for the control and/or regulation of motor vehicle components. For example, in the context of DE 411 10 23 A1 a system is described, which consists of elements for carrying out control operations related at least to the engine output, the drive input power and the braking process, and elements that coordinate the cooperation of the said elements for carrying out control operations, the elements being arranged in the form of a hierarchy so that elements at one level of the hierarchy can act upon elements at the next level of the hierarchy.

In addition, from DE 198 38 336 A1 a system for controlling the movement of a motor vehicle is known, which consists of several levels such that at least one component for controlling the vehicle's movement is provided at a first level, which as a refinement contains at least one positive drive component and brakes at a second level. Further, at a third level this component is structured into two individual components, drive and braking system. In this system, the components can communicate with one another to exchange information.

Thus, in these known methods there is a rough structuring for functions of the drive train and braking system; the functional structure is organized as a tree structure, which restricts the cooperation of the functions, particularly in relation to the specification of required operating modes or nominal values.

Furthermore, in the known approaches the structuring of control and/or regulation functions that act upon lower structural levels, and the details of the communication relationships between the functions, are not defined.

The purpose of the present invention is to indicate a method for interlinking regulation and/or control functions in a motor vehicle, which avoids the disadvantages typical of the prior art.

In particular the intention is to indicate a defined prescription for establishing a function and communication structure down to lower hierarchy levels. In addition the structure produced by the method should be interlinked in a failure-resistant manner, so that the control functions remain active when communication is defective or when other functions fail. A further aim is to enable easy extension to additional control and/or regulation functions, without modifying the existing structures.

SUMMARY OF THE INVENTION

According to these, it is proposed to define the distribution of the control and/or regulation functions and the communications structure of the control and/or regulation functions by means of graphs containing nodes and directed gridlines, in which the nodes of the graphs represent control and/or regulation functions and the directed gridlines represent defined communication paths of the control and/or regulation functions.

For a vehicle with a defined number of control intervention points involving corresponding actuators, for example level adjustment or service brakes, and a defined number of system parameters to be controlled or regulated, for example vehicle level or wheel slip, according to the invention the various control and regulation algorithms are distributed among various control and/or regulation functions and the communication of the control and/or regulation functions is defined.

The method according to the invention ensures optimum system behavior in relation to safety, driving comfort and the driver's wishes in each case, in particular by virtue of the ordered interaction of the control and regulation algorithms.

BRIEF DESCRIPTION OF THE DRAWINGS

The invention will now be described, by way of example, with reference to the accompanying drawings in which:

FIG. 3 is an example embodiment of a table according to the present invention that can be used to plot a graph according to the invention;

FIG. 4 is an example embodiment of another table according to the present invention that can be used to plot a graph according to the invention;

FIG. 7 is a schematic diagram illustrating the interlinking relationship between the communicating components according to the invention.

Figure 1:
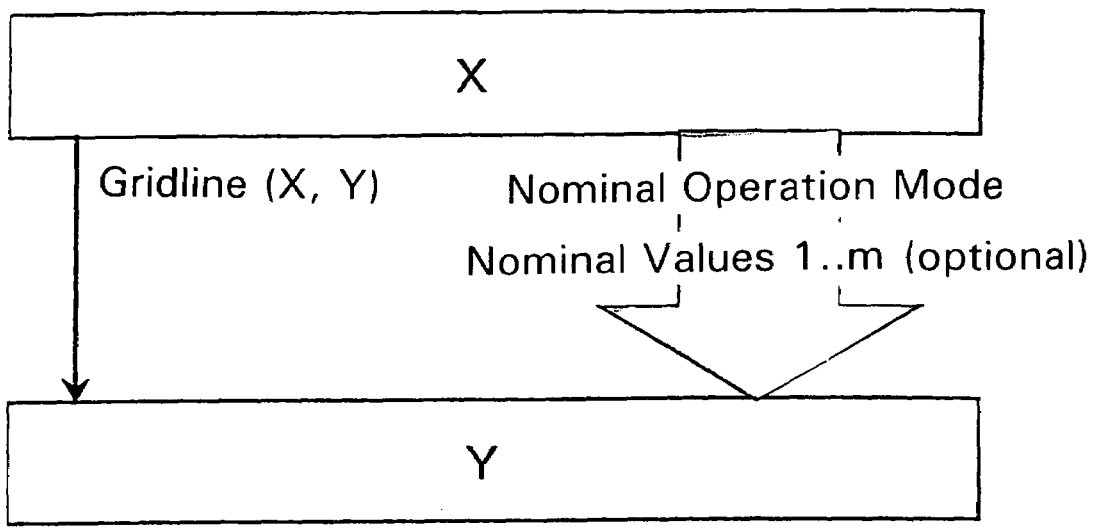
FIG. 1 is a schematic representation of two nodes and a directed gridline and the communication between the control and/or regulation functions involved, according to the present invention.

According to the invention, the distribution of the control and/or regulation functions of two or more systems 1, 2 of a motor vehicle and the communications structure of the control and/or regulation functions are defined by means of graphs containing nodes and directed gridlines; in this, the nodes of the graphs represent control and/or regulation functions and their directed gridlines represent transmission paths of the control and/or regulation functions. An electronic control 3 communicates the graphs and directed gridlines of the two or more systems 1, 2 between the two or more systems 1,2 to limit the negative reciprocal influence on one another. The systems 1,2 can be one or more of, for example, electronic engine controls, electronic transmission controls, ASR (drive slip regulation), ABS (anti-blocking system) functions, shift strategy controls, the level adjustment, body-vehicle acceleration, roll angle, pitch angle, vehicle-level, and individual wheel slip.

According to the invention the directed gridlines of the graphs connect ordered pairs (X, Y) of control and/or regulation functions and can be represented as arrows between the nodes, i.e. the functions. This is represented schematically in FIGS. 1 and 2. A graph contains a finite number of nodes.

According to the invention the nodes are defined as follows: they represent control or regulation functions $G_i$, $R_i$ and $S_i$ such that $G_i$ is at least one function defined for each system parameter $g_i$ to be controlled, which defines nominal values $^{soll}Y_i$ for $g_i$, $R_i$ is at least one function defined for each system parameter $g_i$ to be controlled and/or regulated, which controls and/or regulates $g_i$ by means of nominal values specified for other functions $X_1$, $X_2$, $X_3$ . . . , and $s_i$ is a function defined for each control intervention point $S_i$, which organizes the access of the functions $X_1$, $X_2$, $X_3$, . . . to the control intervention point $s_i$. According to the invention only one node is defined for one function.

According to the invention, instead of two functions $G_i$ and $G_j$ a single function G can define nominal values for the system parameters $g_i$ and $g_j$ or, instead of two functions $R_i$ and $R_j$, a single function R can control the system parameters $g_i$ and $g_j$, so that functions denoted in different ways such as $X_i$ and $X_j$ or $S_i$ and $S_j$ do not necessarily have to be separate functions but can also be amalgamated.

For each function Z, according to the invention an actual operation mode parameter $^{ist}b_Z$ is defined, which can have for example the values "active", "inactive", "limp home", etc. For this the actual operation mode $^{ist}b_Z$ is calculated as follows:

The function Z obtains nominal operation modes $^{soll}b_{X1}$, $^{soll}b_{X2}$, $^{soll}b_{X3}$ . . . $^{soll}b_{Xn}$ from n other functions $X_1$, $X_2$, $X_3$, . . . $X_n$.

The function Z obtains actual operation modes $^{ist}b_{Y1}$, $^{ist}b_{Y2}$, $^{ist}b_{Y3}$, . . . $^{ist}b_{Ym}$ from m other functions $Y_1$, $Y_2$, $Y_3$, . . . $Y_m$.

In addition, there is an internal nominal operation mode of the function Z $^{soll}b_{Zintern}$ (the internal nominal operation mode can for example indicate a fault mode of the function).

The actual operation mode $^{ist}b_Z$ of the function Z is calculated by means of a function-specific function f:

$$^{ist}b_Z = f(^{soll}b_{X1}, ^{soll}b_{X2}, ^{soll}b_{X3}, \ldots ^{soll}b_{Xn}, ^{ist}b_{Y1}, ^{ist}b_{Y2}, ^{ist}b_{Y3}, \ldots ^{ist}b_{Ym}, ^{soll}b_{Zintern}),$$

and for this the calculation can for example be carried out with the aid of access to a (n+m+1)-dimensional array:

$$^{ist}b_Z = \text{Array}(^{soll}b_{X1}, ^{soll}b_{X2}, ^{soll}b_{X3}, \ldots ^{soll}b_{Xn}, ^{ist}b_{Y1}, ^{ist}b_{Y2}, ^{ist}b_{Y3}, \ldots, ^{ist}b_{Ym}, ^{soll}b_{Zintern}).$$

If the function Z receives no external operation mode, then the actual operation mode is calculated solely on the basis of the internal nominal operation mode: $^{ist}b_Z = ^{soll}b_{Zintern}$; transmission of a fault mode to other functions takes place by means of the actual operation mode $^{ist}b_Z$.

For two nodes X and Y the directed gridline (X, Y) is then actually plotted on the graphs when the function X transmits a nominal operation mode to the function Y (FIG. 1). When the gridline (X, Y) is in place, then the function X can optionally transmit to the function Y one or more nominal values α, β, X, . . . for system or control parameters a, b, c, etc.

Figure 2:
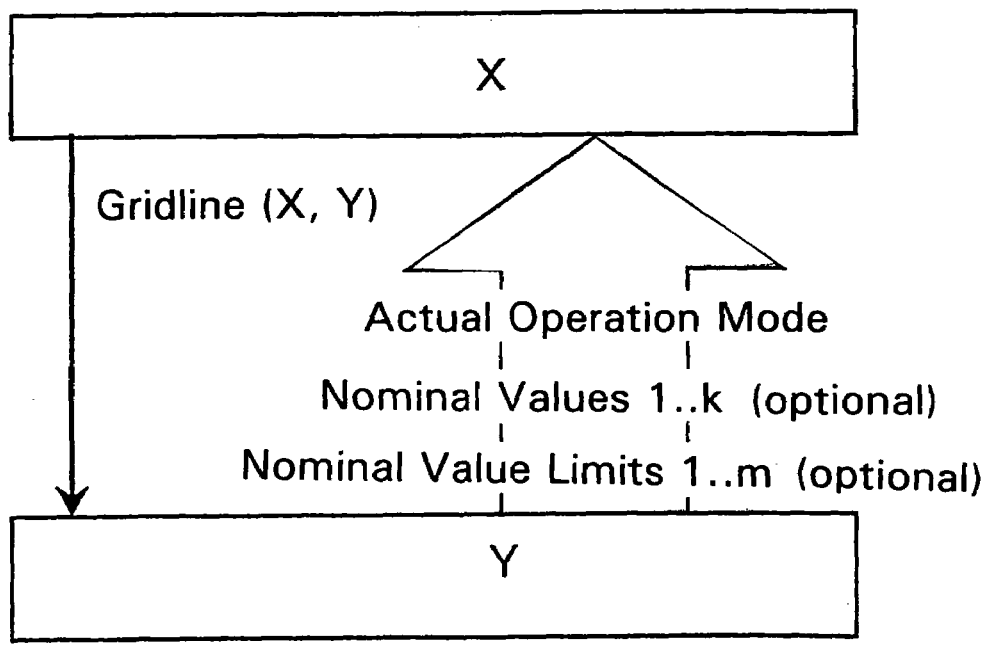
FIG. 2 is a schematic representation of two nodes and a directed gridline and the communication between the control and/or regulation functions involved, in a direction opposite to the communication represented in FIG. 1, according to the present invention.

In addition, when (X, Y) is a gridline in the graph, the function Y must transmit precisely one actual operation condition $^{ist}b_Y$ to the function X, as shown in FIG. 2. If X, Y is a gridline in the graph, then the function Y can optionally transmit to the function X one or more nominal values λ, μ, ν, . . . for system or control parameters l, m, n, . . . as illustrated in FIG. 2.

By virtue of the actual operation condition $^{ist}b_Y$ the function X can for example evaluate whether the function Y is implementing the specification of the nominal operation mode and perhaps the nominal values. If the function Y is not implementing the specifications to a sufficient extent, then according to the invention the function X must look for alternatives for the implementation of the target specifications. For example, targets of the function X could be realized with the help of other functions $Y_2$, $Y_3$, $Y_4$, . . . ; it can also be provided that the function X reacts with a change of its own operation mode.

According to the invention, when (X, Y) is an gridline in the graph, the function Y can transmit to the function X optional limits $\alpha_{min}$, $\alpha_{max}$, $\beta_{min}$, $\beta_{max}$, $\chi_{min}$, $\chi_{max}$, . . . within which the function Y can realize nominal value specifications for system or control parameters a, b, c, . . . In this way the function X can test the practicability of its nominal value specifications by the function Y and if necessary activate further functions $Y_2$, $Y_3$, $Y_4$, . . .

Although with a directed gridline (X, Y) the function Y does not transmit any nominal operation mode to the function X, by transmitting nominal values to the function X, the function Y can influence X so as to realize the target specifications of Y. Sometimes the function X will have to pass on the nominal values to other functions. For example, resources (for example in relation to energy supply) can be called for. Besides, a function X can transmit actual system parameters to a function Y without the gridline (X, Y) being defined in the graph; for example, this can be the case with sensor values.

When several functions $X_1$, $X_2$, $X_3$, . . . transmit nominal values $^{soll}w_{X1}$, $^{soll}w_{X2}$, $^{soll}w_{X3}$, . . . for a parameter w to the function Y, then according to the invention access conflicts are prevented as follows:

Depending on the actual operation mode $^{ist}b_Y$ of the function Y, the function Y decides which of the nominal values $^{soll}w_{X1}$, $^{soll}w_{X2}$, $^{soll}w_{X3}$, . . . will be used or how the nominal value to be used for the parameter w is to be calculated from $^{soll}w_{X1}$, $^{soll}w_{X2}$, $^{soll}w_{X3}$, . . . In addition, the calculation of the actual operation mode by means of nominal or actual operation modes is carried out in such manner that a clear selection or calculation of the nominal value for w emerges from the quantity of the nominal values $\{^{soll}w_{X1}, ^{soll}w_{X2}, ^{soll}w_{X3}, \ldots \}$.

Alternatively, the decision which of the nominal values $\{^{soll}w_{X1}, ^{soll}w_{X2}, ^{soll}w_{X3}, \ldots \}$ or which calculation method should be used can be specified by a defined function Z where $Z \notin \{X_i\}$ and $Z \neq Y$, so that in this case the function Z transmits an operation mode $^{soll}b_Z$ to the function Y so that the calculation of the internal actual operation mode $^{ist}b_Y$ and thus the selection of a nominal value or a calculation method takes place in such manner that the nominal value or the calculation method of the nominal value for w depends only on $^{soll}b_Z$.

Thus, the nominal operation modes regulate the cooperation of the control functions in a clear and deterministic way.

According to the invention the gridlines of the graphs are so chosen that no directed cycle is produced. This means that a function cannot indirectly specify an operation mode for itself along a communication chain $X_1$-$X_2$-$X_3$- . . . $X_n$-$X_1$. For example, according to the invention it is not possible that both (X, Y) and (Y, X) are directed gridlines in the graph, since this would produce a directed cycle X-Y-X.

According to the invention, the directed gridlines of a graph can for example be determined by the following process:

A first table is prepared according to FIG. 3, in the first column of which the functions $G_i$ and in the first row of which the functions $R_i$ are entered, so that cells ($G_i$, $R_i$) are produced. When $G_i$ defines a nominal value for $g_i$, then a cross "x" is inserted in the cell ($G_i$, $R_i$) of the table or the said cell ($G_i$, $R_i$) is marked.

Then, a second table according to FIG. 4 is prepared, in whose first row the functions $s_i$ and in whose first column the functions $R_i$ are entered. When the control parameter $s_i$ affects the system parameter $g_j$ and the function $R_i$ uses the function $s_i$ for the control and/or regulation of $g_j$, then a cross "x" is inserted in cell ($R_i$, $S_j$) of the table (or the cell ($R_i$, $S_j$) is marked).

Figure 5:
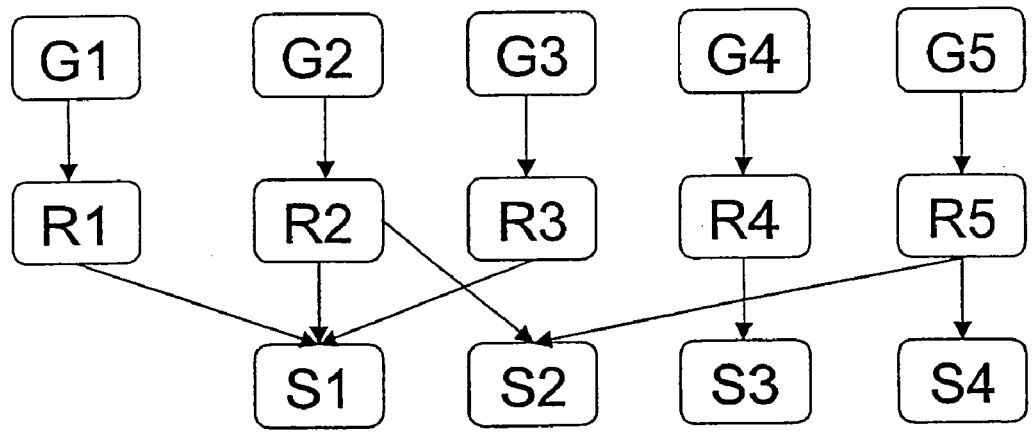
FIG. 5 is a example of a graph plotted by means of the method according to the invention.

According to the invention, the cells marked with "x" in the tables are the necessary gridlines of the associated graph, which is the object of FIG. 5.

The invention will now be described in more detail with reference to an example application.

The control interventions

| | |
|---|---|
| $s_1$ | variable damping, |
| $s_2$ | stabilizer torque, |
| $s_3$ | level regulation and |
| $s_4$ | engine torque | and the corresponding functions $s_1$, $s_2$, $s_3$ and $s_4$ are defined. In this, to simplify the representation of the example application the control interventions on control parameters of the same type are summarized as one control intervention. For example, the damping interventions on individual wheels are summarized as one control intervention $s_1$, for simplicity. As system parameters

| | |
|---|---|
| $g_1$ | body - vertical acceleration, |
| $g_2$ | roll angle, |
| $g_3$ | pitch angle, |
| $g_4$ | vehicle level and |
| $g_5$ | wheel slip | and the corresponding functions $G_1$, $G_2$, $G_3$, $G_4$ and $G_5$ are defined. In this, $G_1$ defines a nominal value $^{soll}Y_1$ for the vertical acceleration, $G_2$ a nominal value $^{soll}Y_2$ for the roll angle, $G_3$ a nominal value $^{soll}Y_3$ for the pitch angle, $G_4$ a nominal value $^{soll}Y_4$ for the vehicle level and $G_5$ a nominal value $^{soll}Y_5$ for the wheel slip. In addition, the functions $R_1$ control/regulation of body vertical acceleration, $R_2$ control/regulation of roll angle, $R_3$ control/regulation of pitch angle, $R_4$ level regulation and $R_5$ wheel slip regulation are defined.

According to the table shown in FIG. 3, for example between {$G_i$} and {$R_i$} the following directed gridlines are determined:

($G_1$, $R_1$), ($G_2$, $R_2$), ($G_3$, $R_3$), ($G_4$, $R_4$), ($G_5$, $R_5$)

The directed gridlines between the functions {$R_i$} and {$S_i$} can be seen in the table of FIG. 4:

($P_1$, $S_1$), ($R_2$, $S_1$), ($R_3$, $S_1$), ($R_2$, $S_2$), ($R_5$, $S_2$), ($R_4$, $S_3$), ($R_5$, $S_4$)

For example the gridline ($R_5$, $S_4$) allows for the possibility that a function $R_5$, which regulates the wheel slip, intervenes directly in the stabilizer in safety-critical driving situations, in order to obtain a corresponding wheel load.

As the outcome of the method for interlinking regulation and/or control functions, the graph in FIG. 5 is obtained. This functional structure cannot be represented in the form of a tree.

Figure 6:
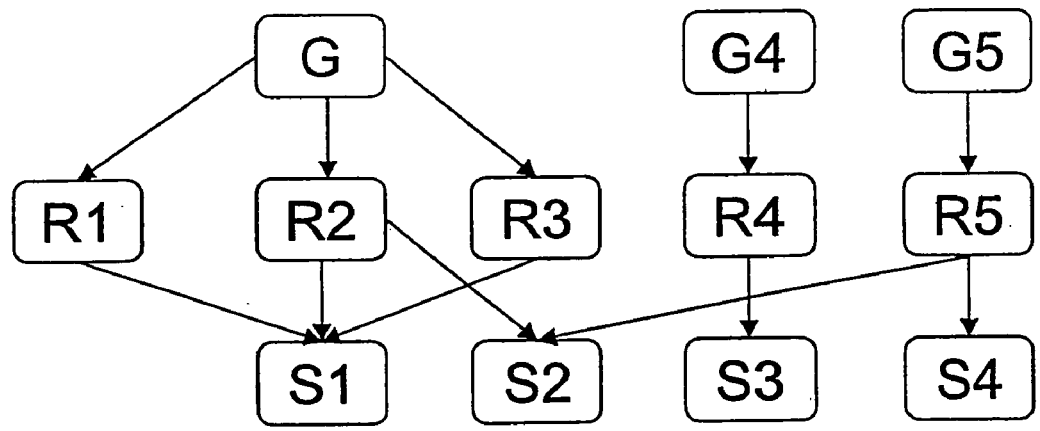
FIG. 6 is an example of another graph plotted by means of the method according to the invention.

As already mentioned, functions can be combined. For example, if $G_1$, $G_2$ and $G_3$ are combined as one function G, the graph shown in FIG. 6 is produced.

The invention claimed is:

1. A method for mapping a hierarchical control structure defining the communication and application of regulation and control functions in an electronic control of a motor vehicle according to an array comprising a plurality of predefined nodes and directed gridlines between the nodes, the method comprising the steps of:
   defining each of the plurality of nodes according to the regulation and control function of a specified motor vehicle operating system;
   connecting the directed gridlines as a communications path between specified nodes for transmitting at least one nominal value between the regulation and control functions specified by the connected nodes;
   transmitting at least one nominal operation value from a first node to a connected second node and transmitting one actual operation condition from the second node to the first node; and
   evaluating the actual operation condition according to the regulation and control function of the first node to determine if the second node is properly implementing the at least one nominal value within an appropriate target specification for the specified motor vehicle operating system.

2. The method according to claim 1, further comprising the step of linking the nodes according to the directed gridlines between the nodes for transmitting ordered pairs (X, Y) between the regulation and control functions along the communications paths.

3. The method according to claim 1, further comprising the steps of defining the nodes to represent the regulation and control functions according to variables: $G_i$, $R_i$ and $S_i$, wherein $G_i$ is at least one function defined for each system parameter $g_i$ to be controlled, which defines nominal values $^{soll}Y_i$ for $g_i$, $R_i$ is at least a second function defined for each system parameter $g_i$ to be controlled, which controls or regulates $g_i$ by means of nominal value specifications for other functions $X_1$, $X_2$, $X_3$, . . . and $S_i$ is a third function defined for each control intervention point $s_i$, which organizes interventions of function $X_1$, $X_2$, $X_3$, . . . on the control intervention point $s_i$, only one node being provided for one function.

4. The method according to claim 3, further comprising the establishment of the directed gridlines according to the following steps:

preparing a first table in whose first column the functions $G_i$ and in whose first row the functions $R_i$ are entered, so that cells $(G_i, R_i)$ are produced, and when $G_i$ defines a nominal value for $g_i$, this cell $(G_i, R_i)$ of the table is marked;

preparing a second table in whose first row the functions $S_i$ and in whose first column the functions $R_i$ are entered, and when the control parameter $s_i$ influences the system parameter $g_j$ and the function $R_i$ uses the function $S_i$ to control $g_j$ the cell $(R_i, S_i)$ is marked, such that the marked cells of the two tables indicate the directed gridlines of the associated graph.

5. The method according to claim 1, further comprising the step of entering between two nodes $(X, Y)$ just one directed gridline $(X, Y)$ in the array when the function X transmits a nominal operation mode to the function Y, such that when $(X, Y)$ is a directed gridline in the array, the function Y transmits just one actual operation condition $^{ist}b_Y$ to the function X.

6. The method according to claim 5, further comprising the step of additionally transmitting from the function X to the function Y one or more nominal values $\alpha, \beta, X, \ldots$ for system or the control parameters a, b, c, ... and the function Y transmits to the function X one or more nominal values $\Lambda, \mu, \nu, \ldots$ for system or control parameters l, m, n, ....

7. The method according to claim 1, further comprising the step of transmitting via a directed gridline $(X, Y)$ the function Y to the function X optional limits $\alpha_{min}, \alpha_{max}, \beta_{min}, \beta_{max}, \chi_{min}, \chi_{max}, \ldots$ within which nominal value specifications of the function X for system or control parameters a, b, c, ... can be realized by the function Y.

8. The method according to claim 1, further comprising the step of transmitting several functions $X_1, X_2, X_3, \ldots$ to the function Y nominal values $^{soll}w_{X1}, ^{soll}w_{X2}, ^{soll}w_{X3}, \ldots$ for a parameter w, access conflicts are prevented in that, depending on the actual operation mode $^{ist}b_Y$ of the function Y, the function Y decides which of the nominal values $^{soll}w_{X1}, ^{soll}w_{X2}, ^{soll}w_{X3}, \ldots$ will be used or how the nominal value for the parameter w will be calculated from $^{soll}w_{X1}, ^{soll}w_{X2}, ^{soll}w_{X3}, \ldots$ such that the calculation of the actual operation mode by means of nominal operation modes or actual operation mode is carried out in such manner that a clear selection or calculation of the nominal value for w emerges from the quantity of nominal values $^{soll}w_{X1}, ^{soll}w_{X2}, ^{soll}w_{X3}, \ldots$.

9. The method according to claim 1, further comprising the step of choosing the gridlines of the graphs such that no directed cycle is produced.

10. A method for interlinking one or more of regulation and control functions of two or more systems in a motor vehicle, the method comprising the steps of:

defining one or more of the regulation or control functions and a communications structure of the one or more of the regulation or control functions of the two or more systems as graphs containing nodes and directed gridlines, such that the nodes of the graphs represent the one or more of the regulation or control functions and directed gridlines represent defined communication paths of the one or more of the regulation or control functions, and;

communicating the one or more of the regulation or control functions and a communications structure of the one or more of the regulation or control functions of the two or more systems between the two or more systems by an electronic control.

11. The method according to claim 10, wherein the directed gridlines of the graphs are ordered pairs $(X, Y)$ of the one or more of the regulation or control, which are represented as arrows between the nodes.

12. The method according to claim 10, wherein the nodes represent the one or more of the regulation or control functions $G_i$, $R_i$ and $S_i$ such that $G_i$ is at least one function defined for each system parameter $g_i$ to be controlled, which defines nominal values $^{soll}Y_i$ for $g_i$, $R_i$ is at least a second function defined for each system parameter $g_i$ to be controlled, which controls or regulates $g_i$ by means of nominal value specifications for other functions $X_1, X_2, X_3, \ldots$ and $S_i$, is a third function defined for each control intervention point $s_i$, which organizes interventions of function $X_1, X_2, X_3, \ldots$ on the control intervention point $s_i$, only one node being provided for one function.

13. The method according to claim 10, wherein for two nodes $(X, Y)$ just one directed gridline $(X, Y)$ is entered in the graph when the function X transmits a nominal operation mode to the function Y, such that when $(X, Y)$ is a directed gridline in the graph, the function Y transmits just one actual operation condition $^{ist}b_Y$ to the function X.

14. The method according to claim 13, wherein the function X additionally transmits to the function Y one or more nominal values $\alpha, \beta, \chi, \ldots$ for system or the control parameters a, b, c, ... and the function Y transmits to the function X one or more nominal values $\Lambda, \mu, \nu, \ldots$ for system or control parameters l, m, n, ....

15. The method according to claim 11, wherein via a directed gridline $(X, Y)$ the function Y transmits to the function X optional limits $\alpha_{min}, \alpha_{max}, \beta_{min}, \beta_{max}, \chi_{min}, \chi_{max}, \ldots$ within which nominal value specifications of the function X for system or control parameters a, b, c, ... can be realized by the function Y.

16. The method according to claim 11, wherein when several functions $X_1, X_2, X_3, \ldots$ transmit to the function Y nominal values $^{soll}w_{X1}, ^{soll}w_{X2}, ^{soll}w_{X3}, \ldots$ for a parameter w, access conflicts are prevented in that, depending on the actual operation mode $^{ist}b_Y$ of the function Y, the function Y decides which of the nominal values $^{soll}w_{X1}, ^{soll}w_{X2}, ^{soll}w_{X3}, \ldots$ will be used or how the nominal value for the parameter w will be calculated from $^{soll}w_{X1}, ^{soll}w_{X2}, ^{soll}w_{X3}, \ldots$, such that the calculation of the actual operation mode by means of nominal operation modes or actual operation mode is carried out in such manner that a clear selection or calculation of the nominal value for w emerges from the quantity of nominal values $^{soll}w_{X1}, ^{soll}w_{X2}, ^{soll}w_{X3}, \ldots$.

17. The method according to claim 10, wherein the gridlines of the graphs are chosen such that no directed cycle is produced.

18. The method according to claim 12, wherein the establishment of the directed gridlines comprises the following steps:

a first table is prepared, in whose first column the functions $G_i$ and in whose first row the functions $R_i$ are entered, so that cells $(G_i, R_i)$ are produced, and when $G_i$, defines a nominal value for $g_i$, this cell $(G_i, R_i)$ of the table is marked;

a second table is prepared, in whose first row the functions $S_i$ and in whose first column the functions $R_i$ are entered, and when the control parameter $s_i$ influences the system parameter $g_j$ and the function $R_i$ uses the function $S_i$ to control $g_j$ the cell $(R_i, S_i)$ is marked, such that the marked cells of the two tables indicate the directed gridlines of the associated graph.

* * * * *